(12) United States Patent
Simpson et al.

(10) Patent No.: US 7,866,282 B2
(45) Date of Patent: Jan. 11, 2011

(54) ANIMAL RESTRAINT APPARATUS AND RELATED METHODS

(75) Inventors: Terence Earl Simpson, 3605 Jack Swartz Rd., Merritt, British Columbia (CA) V1K 1N8; Mark Horton Radford, Vancouver (CA); Michael Howard Boudreau, Salmon Arm (CA)

(73) Assignee: Terence Earl Simpson, Merritt BC (CA)

( * ) Notice: Subject to any disclaimer, the term of this patent is extended or adjusted under 35 U.S.C. 154(b) by 0 days.

(21) Appl. No.: 11/913,289

(22) PCT Filed: May 5, 2006

(86) PCT No.: PCT/CA2006/000733

§ 371 (c)(1),
(2), (4) Date: Jul. 9, 2008

(87) PCT Pub. No.: WO2006/116880

PCT Pub. Date: Nov. 9, 2006

(65) Prior Publication Data

US 2008/0257278 A1    Oct. 23, 2008

Related U.S. Application Data

(60) Provisional application No. 60/594,775, filed on May 5, 2005.

(51) Int. Cl.
*A01K 1/04* (2006.01)
(52) U.S. Cl. ...................................... 119/781; 119/789
(58) Field of Classification Search ................ 119/780, 119/781, 769, 788, 789, 791, 770, 796, 784, 119/786, 787, 790; D30/154
See application file for complete search history.

(56) References Cited

U.S. PATENT DOCUMENTS 209,783 A    11/1878    Warlow (Continued)

OTHER PUBLICATIONS

"International Search Report," dated Aug. 10, 2006, 3 pages.

(Continued)

*Primary Examiner*—T. Nguyen
(74) *Attorney, Agent, or Firm*—Woodcock Washburn LLP

(57) ABSTRACT

A process and apparatus for restraining an animal involves urging a spool containing a flexible tension link connectable to the animal, to retract the flexible tension link into a housing to which the spool is mounted. Movement of the spool in a direction associated with retraction of the flexible tension link disengages a brake urged into braking engagement with the spool, and causes the brake to engage with a lock operably configured to lock the brake in an unengaged position. The flexible tension link is permitted to be dispensed from the spool when the brake is in the unengaged position, and a hand operated actuator on the housing can release the lock to permit the brake to engage the spool to stop dispensing the flexible tension link in response to actuation of the hand operated actuator. The process further involves enabling a spool-operated actuator to release the lock to permit the brake to engage the spool to stop dispensing the flexible tension link. A spool-operated actuator can alternatively release the lock to permit the brake to engage the spool to stop dispensing the flexible tension link when at least one of a plurality of discrete pre-determined lengths of flexible tension link have been dispensed from the spool.

27 Claims, 8 Drawing Sheets

U.S. PATENT DOCUMENTS

| | | | |
|---|---|---|---|
| 236,091 A | 12/1880 | Rodger |
| 474,928 A | 5/1892 | Steele |
| 548,062 A | 10/1895 | Joyner |
| 582,702 A | 5/1897 | Snell |
| 695,427 A | 3/1902 | Davis |
| 802,411 A | 10/1905 | Schaaff |
| 1,060,439 A | 4/1913 | Duxstad |
| 2,087,176 A | 7/1937 | Webb |
| 2,424,368 A | 7/1947 | Oberdorf et al. |
| 2,525,890 A | 10/1950 | Gage |
| 2,551,540 A | 5/1951 | Johnson |
| 2,706,967 A | 4/1955 | Iannetti |
| 2,790,419 A | 4/1957 | Sullivan |
| 3,088,438 A | 5/1963 | Oliphant |
| 3,123,052 A | 3/1964 | Marshall |
| 3,286,962 A | 11/1966 | Warth |
| 3,853,283 A | 12/1974 | Croce et al. |
| 4,796,566 A * | 1/1989 | Daniels | 119/789 |
| 4,887,551 A | 12/1989 | Musetti |
| 5,022,351 A | 6/1991 | Daniels |
| 5,161,487 A | 11/1992 | Miller |
| 5,353,747 A | 10/1994 | Fain |
| 5,575,241 A | 11/1996 | Line |
| 5,732,659 A | 3/1998 | Wiggins |
| 5,785,007 A | 7/1998 | Sauber et al. |
| 5,957,092 A | 9/1999 | Colsch |
| 5,983,836 A | 11/1999 | Chavez |
| 6,314,916 B1 | 11/2001 | Watson, Sr. |
| 6,318,302 B1 | 11/2001 | Bedient |
| 6,374,777 B1 | 4/2002 | Willinger |
| 6,401,656 B1 | 6/2002 | Adkisson |
| 6,408,798 B1 | 6/2002 | Damme |
| 6,523,500 B1 | 2/2003 | Zenteno |
| 6,612,263 B2 | 9/2003 | Scheid et al. |
| 6,648,261 B2 | 11/2003 | Irving |
| 6,886,499 B2 | 5/2005 | Meissner |
| 6,904,871 B1 * | 6/2005 | Archetti et al. | 119/786 |
| 6,904,872 B2 | 6/2005 | Muller |
| 7,168,393 B2 | 1/2007 | Bogdahn |
| 7,234,417 B2 | 6/2007 | Laird |
| 2002/0066417 A1 | 6/2002 | Frazer et al. |
| 2004/0237906 A1 | 12/2004 | Waxman et al. |

OTHER PUBLICATIONS

Flexi USA, www.flexiusa.com (http://www.flexiusa.com/flexi_large.htm) accessed on May 23, 2003.

Flexi Retractable Tie-Out, and De-Tangler Tie-Out, JW, www.petandhorsesupply.com (http://www.petandhorsesupply.com/contain3.html) accessed on May 23, 2003.

Pet Tether Safety Tie-out, www.petsmart.com (http://www.petsmart.com/dog/shopping/tie_outs_chains/products/product_22852.shtml) accessed on May 23, 2003.

Tie-Out Stakes by Top Paw, www.petsmart.com (http://www.petsmart.com/dog/shopping/tie_outs_chains/products/product_20602.shtml) accessed on May 23, 2003.

PetCoil 25' Tie-Out, www.dogtoys.com (http://www.dogtoys.com/petcoiltieout.html) accessed on May 23, 2003.

Photographs (#1-7) of Flexi 2-8 Retractable Leash, available before filing date of patent application.

* cited by examiner

ANIMAL RESTRAINT APPARATUS AND RELATED METHODS

CROSS-REFERENCE TO RELATED APPLICATIONS

This application is the National Stage of International Application No. PCT/CA2006/000733 filed 5 May 2006, which claims the benefit of U.S. Provisional Patent Application No. 60/594,775, filed 5 May 2005, the disclosures of which are incorporated herein by reference in their entireties.

BACKGROUND OF THE INVENTION

1. Field of Invention

This invention relates to animal restraints, and more particularly, to an animal restraint apparatus conveniently convertible for use as either a leash or tether.

2. Description of Related Art

Taking a pet, such as a dog, for a walk is a popular pastime. In urban settings, the movement of the pet is typically controlled by using a leash. It has been found to be particularly convenient to use a hand-held leash assembly having the leash wound on an inner spool or reel, since this allows the pet owner to provide a variable-length leash. Thus, when the pet moves away from the pet owner, an additional length of leash is paid out from the hand-held leash assembly, effectively providing a longer leash, whereas when the pet moves toward the pet owner, the hand-held leash assembly takes up slack in the leash, effectively providing a shorter leash. Hand-held leash assemblies may be equipped with a "stop" button which, when pressed, can temporarily prevent further extension of the leash from the hand-held leash assembly. The stop button allows the pet owner to temporarily stop the pet if the pet begins to wander into danger, for example, into traffic.

After the pet has been taken for a walk, or even during the walk, it may be desirable to tether the pet to a fixed location, for example, in the middle of a field or yard. The process of tethering the pet typically involves two steps: detaching the pet from the hand-held leash assembly, and attaching the pet to a tether, which may be a rope or chain attached to a fixed object such as a tree. This two-step process may not be easy with a large, and powerful pet. Moreover, tethering a pet can create its own set of problems. Often, pets get tangled up with their leash when they are tethered. For example, a dog may continue to move around the tree to which it is tethered in a single direction until it is tangled. In addition, because the tethering leash is not kept taut, it drags on the ground and gets dirty and may even get damaged. In any event, a fixed object, such as a tree, may not be available for use as a tether point in some locations.

To address the above problems, several devices have been provided for converting a hand-held retractable leash assembly into a tether. In one type of device, a hand-held retractable leash assembly is placed and locked into a standard-size locking box, which is itself permanently pivotally-mounted on a post operable to be secured to the ground at a fixed location. However, hand-held leash assemblies on the market come in many sizes and shapes and there is no guarantee that any given leash assembly will fit such a standard-size locking box. Furthermore, it appears that in some cases, if a leash assembly does not have a snug fit within the locking box, the leash assembly may be thrown around inside the box when the pet engages in sudden movement, which could damage the leash assembly. If the leash assembly has actuators or controls on its housing, these actuators or controls may also be inadvertently jostled, with unpredictable consequences. Also, the locking-box and its associated pivoting mechanism tend to be bulky, thus the overall combination of locking-box and post is not very convenient to carry in cases where a portable tether is needed.

In another type of device, which avoids some of the aforesaid problems, a post with a pivotably-mounted clip is provided, wherein the handle of a hand-held leash assembly is hooked onto the clip. However, it will be appreciated that such a device cannot hold the leash assembly securely, once again making it subject to the problems described above. Thus, there is a need for an improved process and apparatus for restraining an animal.

SUMMARY OF THE INVENTION

In accordance with one aspect of the invention, there is provided an animal restraint apparatus that has a housing having an opening, an integral carrying handle, a socket separate from the handle, and a dispenser in the housing. The socket is for releasably and pivotably mounting the housing to an anchor. The dispenser is operable to retractably dispense a flexible tension link through the opening, and the flexible tension link is operable to be connected to the animal.

The socket may have an axis approximately coincident with a centre of mass of the housing.

The apparatus may include an anchor having a connector operably configured to cooperate with the socket to releasably and pivotably mount the housing.

The anchor may include a shaft having a shape complementary to the socket.

The anchor may include a screw connected to the shaft for securing the anchor to a body of soil.

The housing may have first and second opposite sides, and the socket may include a passageway through the housing between the first and second opposite sides.

The housing may have at least one projection extending therein, between the first and second sides, and the at least one projection may have an inner wall defining at least part of the passageway.

The projection may have an outer wall, and the dispenser may include a spool rotatably mounted on the projection to rotate about the outer wall.

The dispenser may include a spring that urges the spool to retract the flexible tension link.

The dispenser may include a brake operable to selectively interfere with rotation of the spool. The brake may have an engaged position for interfering with rotation of the spool and a disengaged position for not interfering with rotation of the spool. The brake may be urged into the engaged position.

The spool may have a plurality of spaced apart teeth arranged in an arc, each of the teeth having a cam surface and a locking surface. The locking surfaces of each of the teeth may generally face in a first common angular direction associated with rotation of the spool during dispensing of the flexible tension link. The cam surfaces of each of said teeth may face in a second common angular direction associated with rotation of the spool during retraction of the flexible tension link.

The locking surfaces may include respective indentations operably configured to cooperate with the brake.

The cam surfaces may include respective sloping portions operably configured to cooperate with the brake to cause the brake to assume the disengaged position.

The apparatus may further include an actuator on the housing, coupled to the brake and operable to cause the brake to assume the engaged position.

The actuator may include a lever and a lock operable to engage the brake to lock the brake in the disengaged position, the lever being coupled to the lock to selectively cause the lock to lock or unlock the brake.

The lock may be urged into a locking position.

The lever and the lock may be comprised of a unitary member.

The apparatus may include a control in the housing for selectively setting a desired maximum extension length of the flexible tension link from among at least two possible extension lengths. The control may include a control actuator accessible from outside the housing, each possible extension length being associated with a respective position of the control actuator. The control may be operably configured to cause the brake to assume the engaged position when the desired maximum length of the flexible tension link is reached.

The apparatus may include a lock operable to selectively lock said brake in said disengaged position, and the control may include a movable member coupled to the spool to move by an amount proportional to an amount of rotational movement of the spool. The control may include a lock coupler, and the control actuator may be operably configured to couple movement of the movable member to the lock coupler to cause the lock to unlock the brake to permit the brake to assume the engaged position.

The movable member may include a gear driven by the spool and may have a plurality of surfaces at different radial lengths and angles. The control actuator may include a motion coupler operably configured to be positioned to selectively engage one of the surfaces to transmit motion from the gear to the lock coupler.

The lock coupler may include a lever connected to the lock, the lever having a contact surface cooperating with the motion coupler.

The motion coupler may include a movable link having a first surface operable to contact one of the plurality of surfaces on the gear and a second surface operable to contact the contact surface on the lever.

The control actuator may include a guide for guiding movement of the movable link when one of the plurality of surfaces contacts the first surface. The guide may be movable to selectively position the movable link to cause the first surface to engage one of the plurality of surfaces on the gear.

In accordance with another aspect of the invention, there is provided an animal restraint apparatus that includes a housing having an opening, a dispenser in the housing, and an actuator on the housing. The dispenser is operable to retractably dispense a flexible tension link through the opening, the flexible tension link being operable to be connected to the animal. The dispenser includes a spool rotatably mounted in the housing, and a spring which urges the spool to retract the flexible tension link. The dispenser further includes a brake operable to selectively interfere with rotation of the spool. The brake has an engaged position for interfering with rotation of the spool, and a disengaged position for not interfering with rotation of the spool, the brake being urged into the engaged position. The dispenser also includes a control in the housing for selectively setting a desired maximum extension length of the flexible tension link from among at least two possible extension lengths. The control includes a control actuator accessible from outside the housing, each possible extension length being associated with a respective position of the control actuator. The control is operably configured to cause the brake to assume the engaged position when the desired maximum extension length is reached. The actuator is coupled to the brake and operable to cause the brake to assume the engaged position.

The spool may have a plurality of spaced apart teeth arranged in an arc, each of the teeth having a cam surface and a locking surface. The locking surfaces of each of the teeth may generally face in a first common angular direction associated with rotation of the spool during dispensing of the flexible tension link. The cam surfaces of each of the teeth may face in a second common angular direction associated with rotation of the spool during retraction of the flexible tension link in the same direction.

The locking surfaces may include respective indentations operably configured to cooperate with the brake.

The cam surfaces may include respective sloping portions operably configured to cooperate with the brake to cause the brake to assume the disengaged position.

The actuator may include a lever and a lock operable to engage the brake to lock the brake in the disengaged position, the lever being coupled to the lock to selectively cause the lock to lock or unlock the brake.

The lock may be urged into a locking position.

The lever and the lock may be comprised of a unitary member.

The apparatus may include a control in the housing for selectively setting a desired maximum extension length of the flexible tension link from among at least two possible extension lengths, each possible extension length being associated with a respective position of the control actuator. The control may include a control actuator accessible from outside the housing, and may be operably configured to cause the brake to assume the engaged position when the desired maximum extension length is reached.

The control may include a movable member coupled to the spool to move by an amount proportional to an amount of rotational movement of the spool. The control may include a lock coupler, and the control actuator may be operably configured to couple movement of the movable member to the lock coupler to cause the lock to unlock the brake to permit the brake to assume the engaged position.

The movable member may include a gear driven by the spool. The movable member may also have a plurality of surfaces at different radial lengths and angles, and the control actuator may include a motion coupler operably configured to be positioned to selectively engage one of the surfaces to transmit motion from the gear to the lock coupler.

The lock coupler may include a lever connected to the lock, the lever having a contact surface cooperating with the motion coupler.

The motion coupler may include a movable link having a first surface operable to contact one of the plurality of surfaces on the gear, and a second surface operable to contact the contact surface on the lever.

The control actuator may include a guide for guiding movement of the movable link when one of the plurality of surfaces contacts the first surface. The guide may be movable to selectively position the movable link to cause the first surface to engage one of the plurality of surfaces on the gear.

In accordance with another aspect of the invention, there is provided an animal restraint process which involves selectively dispensing a pre-determined amount of flexible tension link from among at least two discrete predetermined amounts of the flexible tension link in response to withdrawal of the flexible tension link from a dispenser, unless an actuator accessible from outside a housing of the dispenser is actuated to engage a brake in the housing to prevent the dispenser from continuing to dispense the predetermined amount of flexible tension link.

The process may further involve releasably and pivotably mounting the housing to an anchor.

The process may also involve mounting the housing on a shaft such that a centre of mass of the housing is approximately coincident with an axis of rotation of the housing about the shaft.

The process may further involve inserting the shaft into a passageway extending through the housing between the first and second opposite sides thereof.

The process may further involve anchoring the shaft to a body of soil.

Inserting the shaft into the passageway may involve inserting the shaft into a socket.

Selective dispensing may involve causing a spool on which the flexible tension link is wound to rotate about an axis coincident with the axis of rotation of the housing.

In accordance with another aspect of the invention, there is provided a process for restraining an animal. The process involves urging a spool containing a flexible tension link connectable to the animal to retract the flexible tension link into a housing to which the spool is mounted. The process further involves causing movement of the spool in a direction associated with retraction of the flexible tension link, to disengage a brake urged into braking engagement with the spool, and to cause engagement of the brake with a lock operably configured to lock the brake in an unengaged position. The process also involves permitting the flexible tension link to be dispensed from the spool when the brake is in the unengaged position, and enabling a hand operated actuator on the housing to release the lock to permit the brake to engage the spool to stop dispensing the flexible tension link in response to actuation of the hand operated actuator. The process further involves enabling a spool operated actuator to release the lock to permit the brake to engage the spool to stop dispensing the flexible tension link when at least one of a plurality of discrete predetermined lengths of flexible tension link have been dispensed from the spool.

The process may further involve selectively setting a desired maximum extension length of the flexible tension link from among at least two possible discrete predetermined extension lengths.

Setting the desired maximum extension length may involve transferring movement of the spool to an actuator coupled to the lock.

Transferring movement may involve driving a gear with the spool, and selectively engaging one of a plurality of surfaces at different radial lengths and angles on the gear, with a motion coupler to transmit motion from the gear to the brake lock.

The process may further involve selectively positioning the motion coupler to engage one of the plurality of surfaces on the gear and guiding movement of the motion coupler to transfer movement of one of the plurality of surfaces to the brake lock to disengage the brake lock.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
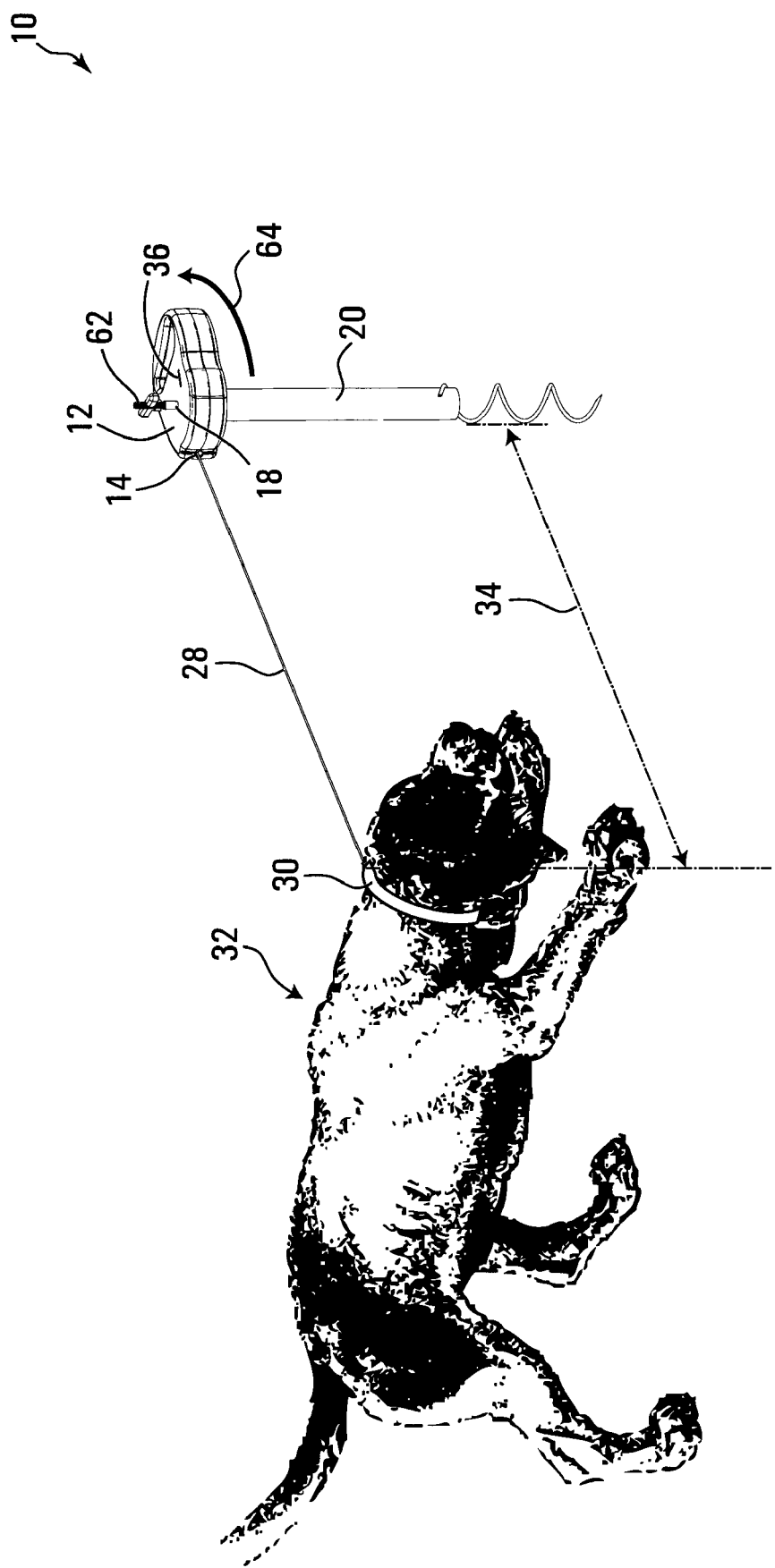
FIG. 1 is a schematic view of an animal restraint system according to a first embodiment of the invention.
Figure 2:
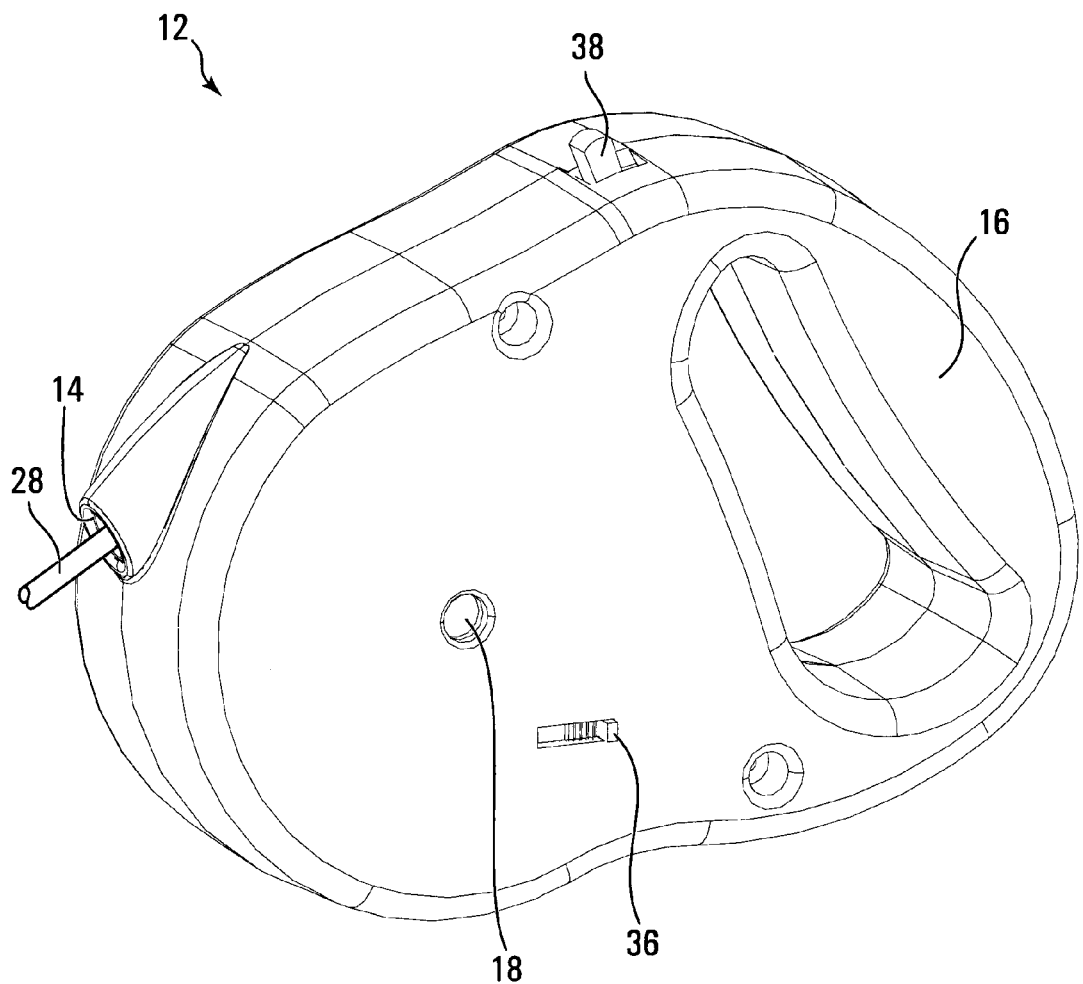
FIG. 2 is a perspective view of an animal restraint apparatus according to a first embodiment of the invention.

Referring to FIG. 1, an animal restraint apparatus according to a first embodiment of the invention is shown generally at 10. Referring to FIGS. 1 and 2, the apparatus 10 includes a housing 12 having an opening 14, an integral carrying handle 16, and a socket or passageway 18 separate from the handle. The socket or passageway 18 facilitates releasable and pivotal mounting of the housing on an anchor shown generally at 20 in FIG. 1.

Figure 3:
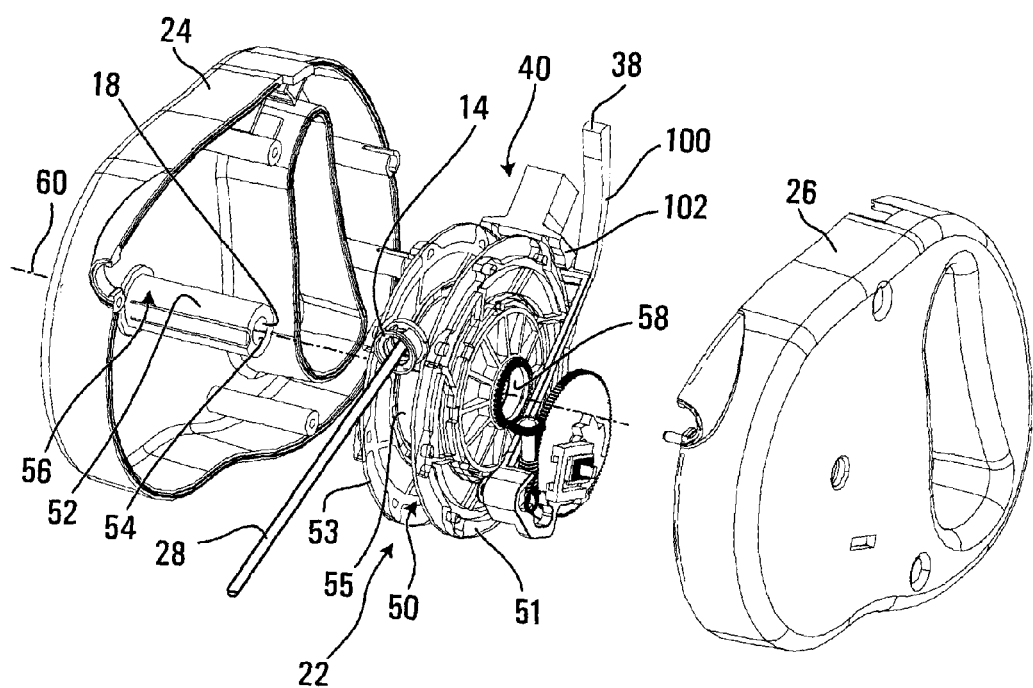
FIG. 3 is an exploded view of the animal restraint apparatus shown in FIG. 2.

Referring to FIG. 3, a dispenser, shown generally at 22, is disposed between first and second sides 24 and 26 of the housing 12 shown in FIGS. 1 and 2 and is operable to retractably dispense a flexible tension link, shown generally at 28, through the opening 14. Referring back to FIG. 1, the flexible tension link 28 may be connected to an animal, for example, it may be connected to a dog collar 30 on a dog 32. While the dog 32 is shown in FIG. 1 as a specific example of an animal in order to illustrate certain embodiments of the invention, it should be understood that this invention is capable of being used to restrain other kinds of animals as well.

From the discussion that follows, it will be appreciated that the dog 32 can cause the flexible tension link 28 to be dispensed by the dispenser 22 up to a predetermined distance 34 upon the dog embarking on radial movement away from the anchor 20, and it will be appreciated that the dispenser 22 retracts the flexible tension link when the dog 32 moves radially toward the anchor 20. The distance 34 may be pre-set by a control actuator 36 on the housing 12 that co-operates with the dispenser 22 to cause the dispenser to cease dispensing flexible tension link 12 when the dog 32 reaches one of a plurality of discrete pre-determined distances 34 from the anchor 20. Thus, the user can selectively restrain the dog 32 to a pre-defined radius from the anchor 20.

The housing 12 also includes a hand-actuated actuator, seen at 36 in FIGS. 2 and 3, which selectively engages a brake, shown at 40, to cause the dispenser 22 to stop dispensing the flexible tension link 28 regardless of the radial distance 34 between the dog 32 and the anchor 20.

Referring to FIG. 3, it will be appreciated that the dispenser 22 is operable to retractably dispense the flexible tension link 28 through the opening 14. The dispenser 22 includes a spool, shown generally at 50, rotatably mounted in the housing 12 on a projection 52 extending in the housing between the first and second sides 24 and 26. As seen in FIG. 3, the spool 50 comprises first and second spaced apart flanges 51 and 53 and a takeup drum 55 disposed therebetween on which an undispensed portion of the flexible tension link 28 is stored.

The dispenser 22 includes a spring (not shown), disposed inside the drum 55, urging the spool to retract the flexible tension link 28. In this embodiment, the spring includes a coil spring configured to be placed under greater and greater tension as withdrawal of the flexible tension link from the housing 12 rotates the spool 50. The projection 52 has an inner wall 54 defining at least part of the passageway 18 through the housing 12. The projection 52 also has an outer wall 56 which co-operates with a bearing surface 58 of the spool 50 to support the spool for rotation about the outer wall 56. Generally, the projection 52 has an axis 60 defining an axis of rotation of the spool 50 and the projection 52 is positioned in the housing 12 such that the axis of rotation generally coincides with a centre of mass of the overall housing 12.

Referring back to FIG. 1, the anchor 20 has a shaft 62 having a shape complementary to the passageway 18 and in this embodiment is operable to hold the housing 12 in a horizontal plane and to permit the housing to rotate in the horizontal plane, as shown by the arrow 64. Since the projection 52 and hence the passageway 18 are located generally coincident with the centre of mass of the housing 12, the housing will freely rotate about the shaft 62 in the horizontal plane thereby reducing the chances of the dog 32 tangling the flexible tension link with the anchor 20.

Figure 4:
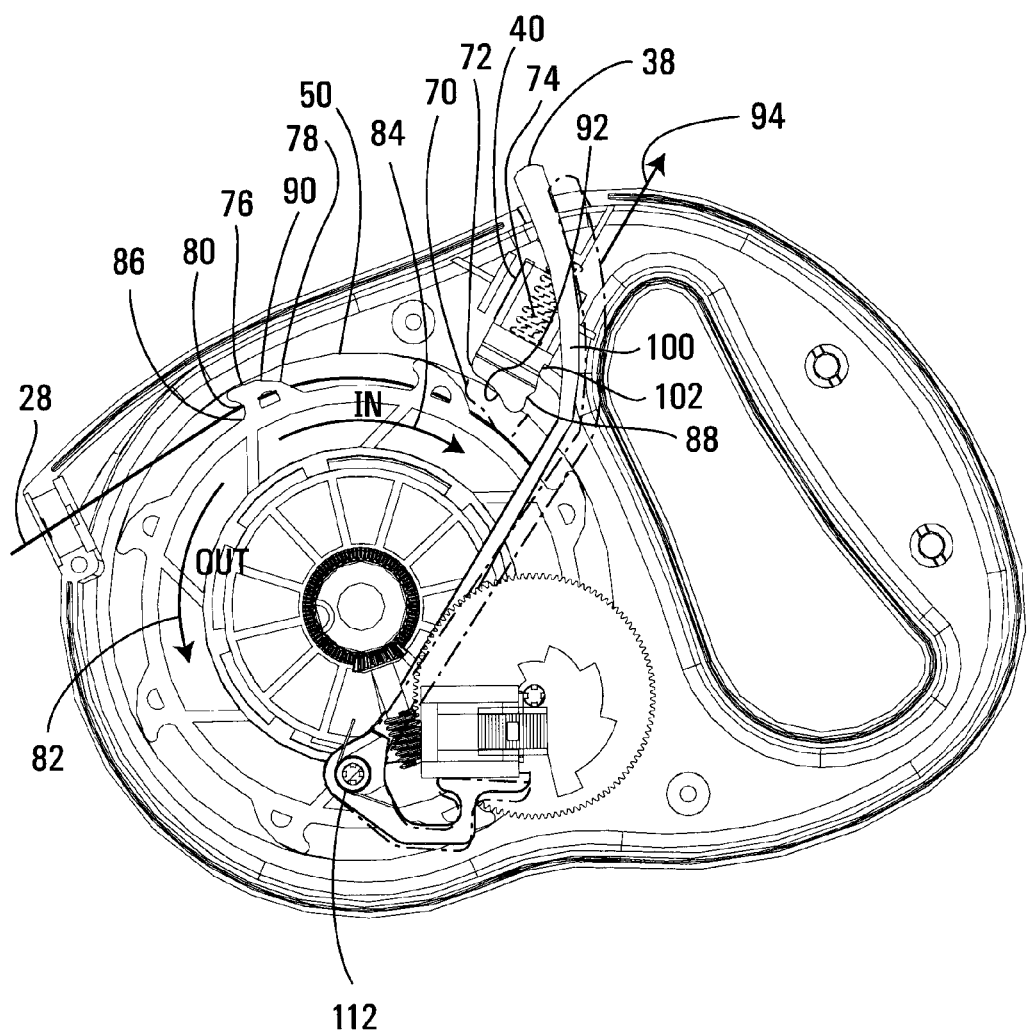
FIG. 4 is a plan view of components inside the housing shown in FIG. 2 with emphasis on illustrating a braking mechanism.

Referring to FIG. 3, the brake 40 is operable to selectively interfere with rotation of the spool 50. Referring to FIG. 4, the brake 40 is shown in an engaged position in broken outline at 70, in which it interferes with rotation of the spool 50. The brake 40 is shown in a disengaged position, shown generally at 72, in which it does not interfere with rotation of the spool 50. In this embodiment, the brake 40 is urged into the engaged position 70 by a spring shown in broken outline at 74.

As seen in FIG. 4, the spool 50 has a plurality of teeth, one of which is shown at 76, arranged in an arc, which in this embodiment is a full circle adjacent a circumference of the first flange 51. A similar set of teeth is disposed in a similar manner on the second flange 53. Each of the teeth 76 has a cam surface 78 and a locking surface 80. The locking surfaces 80 of each of the teeth generally face in a first common angular direction, depicted by arrow 82, associated with rotation of the spool 50 during dispensing of the flexible tension link 28. The cam surfaces 78 of each of the teeth face in a second common angular direction indicated by arrow 84, associated with rotation of the spool 50 during retraction of the flexible tension link 28.

In the embodiment shown, the locking surfaces 80 have indentations 86 operably configured to co-operate with a complimentary shaped engagement surface 88 on the brake 40. In addition, the cam surfaces 78 include respective sloping portions 90 operably configured to co-operate with a corresponding cam surface 92 on the brake 40 to cause the brake to be pushed in the direction of arrow 94 into the disengaged position, shown in solid outline at 72, when the spool 50 is rotated by the coil spring to retract the flexible tension link 28.

Referring to FIGS. 3 and 4, the apparatus further comprises the actuator 38 on the housing. The actuator 38 is coupled to the brake 40 and is operable to ultimately cause the brake to assume the engaged position 70.

In the embodiment shown, the actuator 38 comprises a lever 100 and a lock 102 operable to engage the brake 40 to lock the brake in the disengaged position shown in solid outline in FIG. 4. The lever 100 is coupled to the lock 102 to selectively cause the lock to lock or unlock the brake 40.

Figure 5:
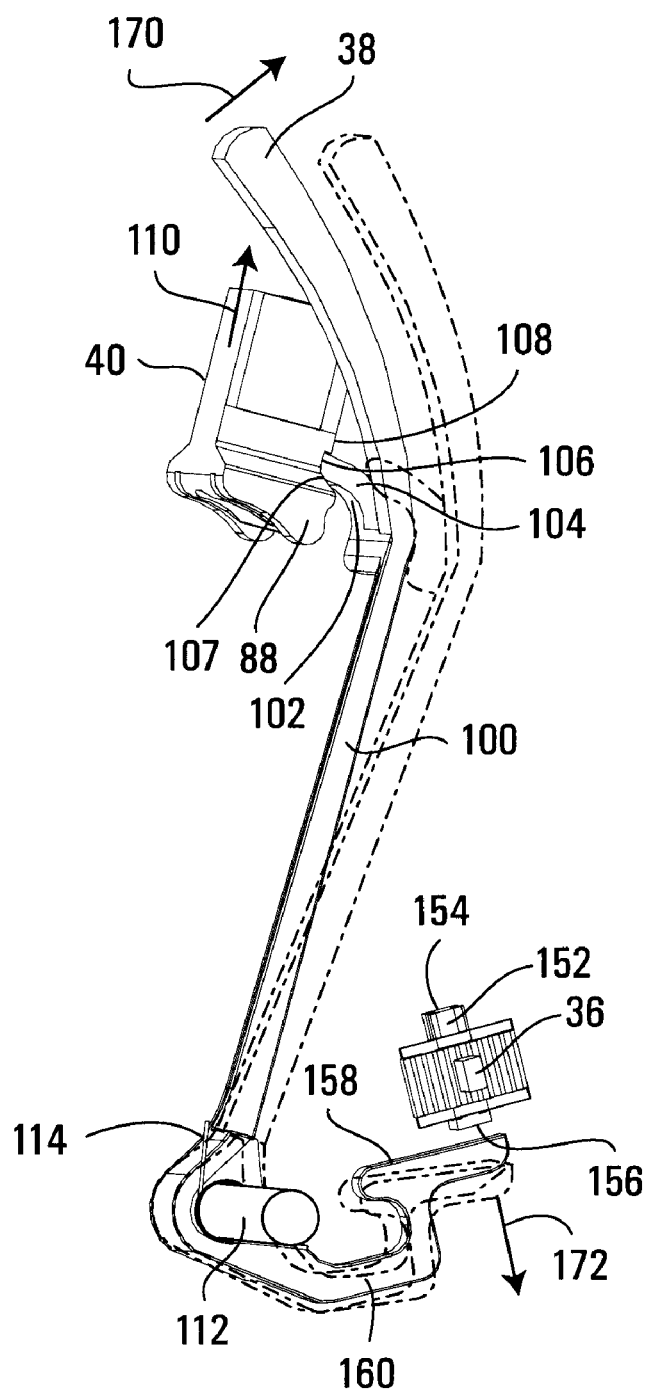
FIG. 5 is a perspective view of a brake, brake lock and associated components of FIG. 4 shown in isolation for greater clarity.

Referring to FIG. 5, the lever 100 and lock 102 are shown in isolation. In this embodiment, the lock 102 includes a projection 104 extending from the lever 100 and operable to engage a recess 107 in the brake 40. The projection 104 has a cam surface 106 that bears against a surface 108 of the brake 40 as the brake slides in the direction of arrow 110 due to engagement with the cam surfaces 78 on the spool 50. The cam surface 106 falls into the recess 107 in the brake 40, when the brake 40 has been pushed sufficiently in the direction of arrow 110 to cause the engagement surface 88 to move away from the locking surfaces 80 on the teeth shown at 76 in FIG. 4, and thus, the lock 102 assumes a locking position.

To facilitate this sliding motion of the brake 40 and receipt of the cam surface 106 of the lock 102 in the recess 107, the lever 100 is rotatable about a pin 112 secured to the housing 12. A spring 114 co-operates with the pin 112 and the lever 100 to urge the lock 102 into the locking position when the brake 40 is moved sufficiently away from the teeth on the spool 50. In this embodiment, it will be appreciated that the lever 100 and the lock 102 are comprised of a unitary member made of hard plastic. They may alternatively however be made of a metal or metal alloy or other relatively rigid material.

Figure 6:
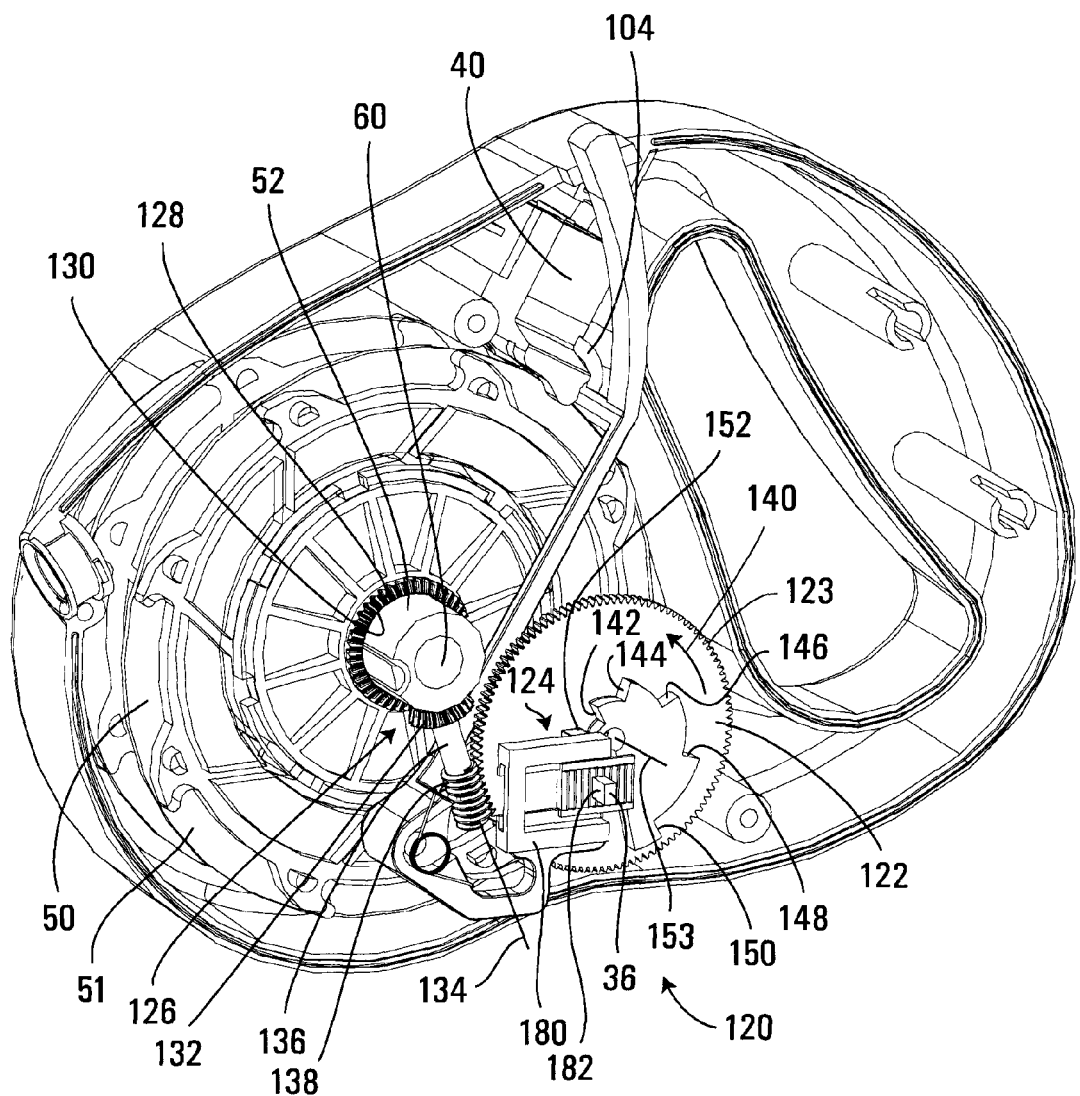
FIG. 6 is a perspective view of an inside of the housing shown in FIG. 2 with emphasis on illustrating a motion coupling mechanism.
Figure 7:
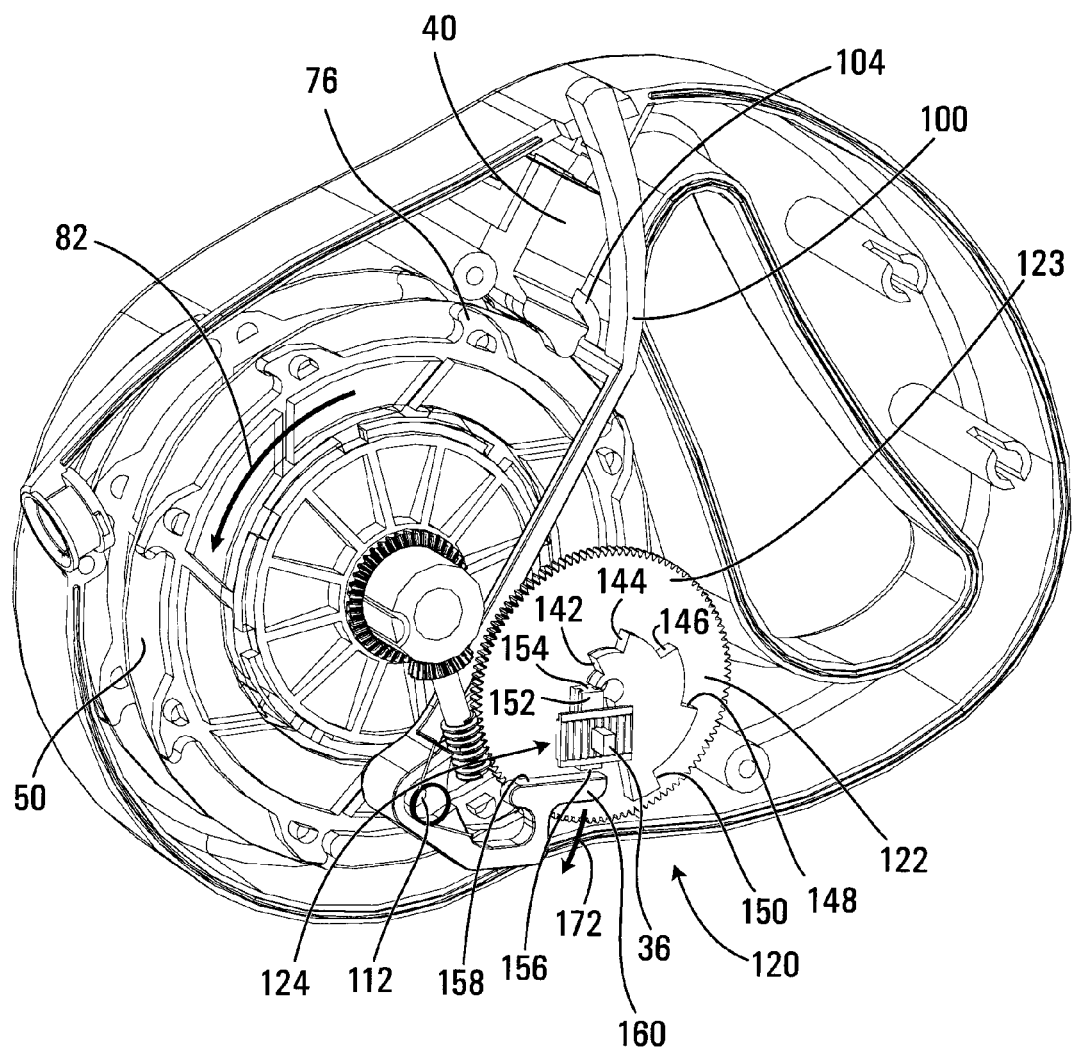
FIG. 7 is a perspective view of components inside the housing shown in FIG. 2 with emphasis on illustrating a brake actuator responsive to rotation of a spool inside the housing shown in FIG. 2.

Referring to FIGS. 6 and 7, the apparatus further includes a control, shown generally at 120, in the housing 12 for selectively setting a desired maximum extension length of the flexible tension link 28 from at least two possible discrete pre-determined extension lengths. In this embodiment, the control 120 comprises the control actuator 36 accessible from outside the housing 12. Each possible extension length is associated with a respective position of the control actuator 36 and the control actuator 36 is operably configured to cause the brake 40 to assume the engaged position when the desired maximum length of the flexible tension link 28 is dispensed from the spool 50.

In this embodiment, the control 120 includes a moveable member 122 rotationally coupled to the spool 50 to move by an amount proportional to an amount of rotational movement of the spool 50. The control 120 further includes a lock coupler, shown generally at 124, operatively configured by the control actuator 36 to couple movement of the moveable member 122 to the lock 102 to cause the lock to unlock the brake 40 to permit the brake to assume the engaged position.

In this embodiment, the moveable member 122 includes a spur gear 123 driven by the spool 50 by a coupling mechanism 126. In this embodiment, the coupling mechanism 126 includes a gear 128 on the first flange 51 and extending about an opening 130 in the spool 50 used to mount the spool to the projection 52. The coupling mechanism 126 further includes a bevel gear 132 co-operating with the gear 128 to translate motion from rotation about the axis 60 to rotation about a secondary axis 134 perpendicular to the axis 60. The bevel gear 132 is connected to a shaft 136 on which is mounted a worm gear 138 which co-operates with the gear 123 that acts as the moveable member 122 to translate rotational motion of the worm gear 138 to the moveable member 122. A significant speed reduction ratio is achieved by this gearing arrangement such that the moveable member 122 rotates, in the direction shown by arrow 140, a proportional fraction of a revolution for every single revolution of the spool 50 in the same direction. (In this direction, the flexible tension link 28 is dispensed from the spool 50.) Similarly, rotation of the spool 50 in the opposition direction, rotates the moveable member 122 in a direction opposite to arrow 140, again by a proportional fractional amount. In this embodiment, the gear ratio may be set such that one full rotation of the moveable member 122 in the direction of the arrow 140 corresponds to the number of full rotations of the spool 50 required to completely dispense the entire capacity of flexible tension link holdable on the spool 50.

In the embodiment shown, the gear 123 is formed with a plurality of surfaces, five of which are shown at 142, 144, 146, 148 and 150 respectively. Each of these surfaces, 142, 144, 146, 148 and 150 is disposed at a different radial distance from an axis 153 of rotation of the gear 123. In addition, each of these surfaces is disposed at a different angle relative to a radial reference line arbitrarily positioned on the gear. In other words, the angles between different surfaces, 142, 144, 146, 148 and 150 are different. It will be appreciated that as the gear 123 rotates in the direction of arrow 140, the surfaces 142, 144, 146, 148 and 150 rotate about the axis 153 in the same direction and approach a motion coupler.

Referring to FIG. 7, the motion coupler includes a moveable link 152 having a first surface 154 operable to contact one of the plurality of surfaces 142, 144, 146, 148 and 150 on the gear 123. The moveable link 152 also has a second surface 156 on a side of the moveable link opposite the first surface 154. The second surface 156 is operable to contact a surface 158 of a second lever 160, which is connected to the lock 102 through the first lever 100 and a pivotal connection about the same pin 112 as the first lever 100. Referring back to FIG. 5, the lock 102 is thus disengaged from the brake 40 when the actuator 38 is moved in the direction of arrow 170 or when the second lever 160 is moved in the direction of arrow 172 by the moveable link 152.

Referring to FIG. 6, the control actuator 36 includes a guide 180 for guiding movement of the moveable link 152 and for guiding movement of a control slider 182 to permit the control slider to selectively position the moveable link 152 at a desired radial distance from the axis 153 to selectively cause whichever one of the surfaces 142, 144, 146, 148 and 150 is disposed at that radial distance to bear upon the first surface 154 of the moveable link 152, when the gear 123 is sufficiently rotated to push the moveable link in the direction of arrow 172. This causes the second surface 156 on the moveable link 152 to bear upon the surface 158 and causes the second lever 160 to move in the direction of arrow 172 thereby rotating the first lever 100 and the second lever 160 about the pin 112 and disengaging the lock 102 from the brake 40. Disengagement of the lock 102 permits the brake 40 to move radially toward the spool axis 60 and to engage one of the teeth 76 on the spool 50 to prevent further rotation of the spool in the dispensing direction 82, thereby preventing further dispensing of the flexible tension link 28.

In effect, the apparatus executes a process for restraining an animal wherein the process involves urging a spool containing a flexible tension link connectable to the animal to retract the flexible tension link into a housing to which the spool is mounted, and causing movement of the spool in a direction associated with retraction of the flexible tension link to disengage a brake urged into braking engagement with the spool and to engage the brake with a lock operably configured lock the brake in an unengaged position. The process further involves permitting the flexible tension link to be dispensed from the spool when the brake is in the unengaged position. The process may further involve enabling a hand-operated actuator on the housing to release the lock to permit the brake to engage the spool to engage the spool to stop dispensing the flexible tension link in response to actuation of the hand-operated actuator, and enabling a spool-operated actuator to release the lock to permit the brake to engage the spool to stop dispensing the flexible tension link when at least one of a plurality of discrete predetermined lengths of flexible tension link have been dispensed from the spool. The process may involve selectively dispensing a predetermined amount of flexible tension link from among at least two discrete predetermined amounts of the flexible tension link in response to withdrawal of the flexible tension link from a dispenser, unless an actuator accessible from outside a housing of the dispenser is actuated to engage a brake in the housing to prevent the dispenser from continuing to dispense the predetermined amount of flexible tension link.

Figure 8:
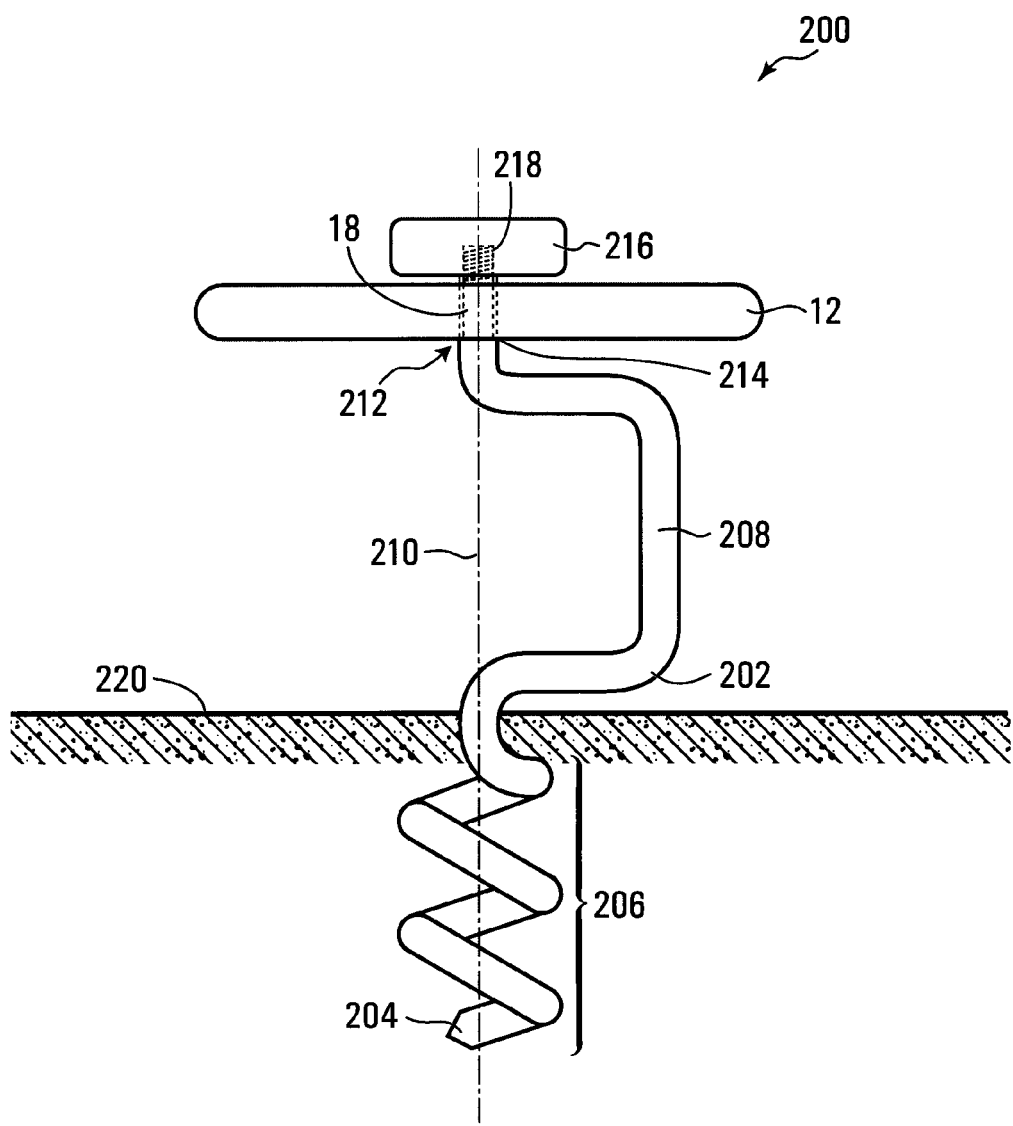
FIG. 8 is a side view of an alternative embodiment of an anchor of the system shown in FIG. 1.

Referring now to FIG. 8, the apparatus housing 12 is shown pivotably and releasably mounted on another embodiment of a portable anchor, shown generally at 200. In this embodiment, the anchor 200 includes a shaft 202 having a tapered end point 204, a screw or a screw-like helical anchor portion 206, an offset portion 208 which is offset relative to an axis 210 of the anchor 200, and a connector, shown generally at 212, operably configured to cooperate with the socket 18 to releasably and pivotably mount the housing 12 thereon. The connector 212 includes a seat 214, a threaded quick release cap 216 configured to be attachable to a threaded portion 218 of the anchor 200. In general, the seat 214 supports the housing 12 and has a shape complementary to the socket 18 to facilitate pivoting movement of the housing 12 about the seat.

In operation, the user secures the anchor 200 to a body of soil 220 by placing the tapered end point 204 on the body of soil 220, exerting a downward force on the cap 216 with one hand while turning the offset portion 208 with the other hand. This drives the anchor 200 into the soil 220 where it is held secure by the screw-like helical anchor portion 206. The quick release cap 216 may then be removed and the socket 18 of the housing 12 is positioned to sit on the seat 214, on which it may freely pivot, after which the cap 216 is reattached. Thus, the connector 212 cooperates with the socket 18 of the housing 12 to releasably and pivotably mount the housing 12 on the anchor 200. In this embodiment, the anchor 200 may be made of a corrosion-resistant metal or metal alloy, however, another equivalent suitable material could be substituted.

While specific embodiments of the invention have been described and illustrated, such embodiments should be considered illustrative of the invention only and not as limiting the invention as construed in accordance with the accompanying claims.

What is claimed is:

1. An animal restraint apparatus, comprising:
   a housing having an opening, an integral carrying handle, and a socket separate from said handle for releasably and pivotably mounting said housing to an anchor; and
   a dispenser in said housing, operable to retractably dispense a flexible tension link through the opening, said flexible tension link being operable to be connected to the animal;
   wherein said housing has first and second opposite sides and wherein said socket comprises a passageway through said housing between said first and second opposite sides; and
   wherein said housing has at least one projection extending therein, between said first and second sides, said at least one projection having an inner wall defining at least part of said passageway.

2. The apparatus of claim 1 wherein said housing has a centre of mass and wherein said socket has an axis approximately coincident with said centre of mass.

3. The apparatus of claim 1 further comprising an anchor having a connector operably configured to cooperate with said socket to releasably and pivotably mount said housing.

4. The apparatus of claim 3 wherein said anchor comprises a shaft having a shape complementary to said socket.

5. The apparatus of claim 4 wherein said anchor comprises a screw connected to said shaft for securing said anchor to a body of soil.

6. The apparatus of claim 1 wherein said at least one projection has an outer wall and wherein said dispenser includes a spool rotatably mounted on said at least one projection to rotate about said outer wall.

7. The apparatus of claim 6 wherein said dispenser includes a spring urging said spool to retract said flexible tension link.

8. The apparatus of claim 7 wherein said dispenser includes a brake operable to selectively interfere with rotation of said spool, said brake having an engaged position for interfering with rotation of said spool and a disengaged position for not interfering with rotation of said spool.

9. The apparatus of claim 8 further comprising an actuator on said housing, coupled to said brake and operable to cause said brake to assume said engaged position.

10. An animal restraint apparatus, comprising:
a housing having an opening, an integral carrying handle;
housing mounting means, separate from said handle, for releasably and pivotably mounting said housing to an anchor; and
dispensing means in said housing, for retractably dispensing a flexible tension link through the opening, said flexible tension link being operable to be connected to the animal;
wherein said housing has first and second sides and wherein said housing mounting means comprises a passageway through said housing between said first and second opposite sides;
wherein said housing has at least one projection extending therein, between said first and second sides, said at least one projection having an inner wall defining at least part of said passageway.

11. The apparatus of claim 10 wherein said housing has a centre of mass and wherein said housing mounting means has an axis approximately coincident with said centre of mass.

12. The apparatus of claim 10 further comprising anchor means having a connector operably configured to cooperate with said housing mounting means to releasably and pivotably mount said housing.

13. The apparatus of claim 12 wherein said housing mounting means includes a socket and wherein said anchor means comprises a shaft having a shape complementary to said socket.

14. The apparatus of claim 13 wherein said anchor means comprises securing means connected to said shaft for securing said anchor means to a body of soil.

15. The apparatus of claim 10 wherein said at least one projection has an outer wall and wherein said dispensing means includes holding means rotatably mounted on said at least one projection, for holding said flexible tension link.

16. The apparatus of claim 15 wherein said dispensing means includes means for urging said holding means to retract said flexible tension link.

17. The apparatus of claim 1 wherein said housing is operably configured to be pivotably mounted such that a longitudinal axis of said anchor remains coincident with an axis of rotation of said housing about said anchor.

18. The apparatus of claim 17 wherein an axis of said socket is coincident with said longitudinal axis of said anchor.

19. The apparatus of claim 1 wherein said socket is operably configured to cooperate with said anchor to cause said housing to be held to rotate about said anchor in a plane.

20. An apparatus for restraining an animal, comprising:
a housing having first and second sides, an opening, and a socket comprising a passageway for releasably and pivotably mounting said housing to an anchor such that said housing is held on said anchor by said socket to rotate about said anchor in a plane, wherein said housing has a projection extending between said first and second sides, said projection having inner and outer walls, said inner wall defining at least part of said passageway; and
a dispenser in said housing, said dispenser comprising a spool rotatably mounted on said projection, and a flexible tension link on said spool, said flexible tension link being operable to be connected to the animal, said spool being operable to rotate about said outer wall of said projection to retractably dispense said flexible tension link through said opening of said housing as the housing rotates in said plane about said anchor, to restrain the animal.

21. The apparatus of claim 20 wherein said housing has a centre of mass and wherein said socket has an axis approximately coincident with said centre of mass.

22. The apparatus of claim 20 further comprising an anchor having a connector operably configured to cooperate with said socket to releasably and pivotably mount said housing.

23. The apparatus of claim 22 wherein said anchor comprises a shaft having a shape complementary to said socket.

24. The apparatus of claim 23 wherein said anchor comprises a screw connected to said shaft for securing said anchor to a body of soil.

25. The apparatus of claim 20 wherein said dispenser includes a brake operable to selectively interfere with rotation of said spool, said brake having an engaged position for interfering with rotation of said spool and a disengaged position for not interfering with rotation of said spool.

26. The apparatus of claim 25 further comprising an actuator on said housing, coupled to said brake and operable to cause said brake to assume said engaged position.

27. An animal restraint system, comprising:
an anchor;
a housing having an opening and a socket, wherein said socket comprises a passageway through said housing, wherein said housing comprises at least one projection extending therein, said at least one projection having an inner wall defining at least part of said passageway, said socket being adapted to facilitate releasable and pivotable mounting of said housing to said anchor, wherein said socket is operably configured to cooperate with said anchor to cause said housing to be held to rotate about said anchor in a plane; and
a dispenser in said housing, said dispenser comprising a spool rotatably mounted on said at least one projection, and operable to retractably dispense a flexible tension link through the opening of said housing as the housing rotates in said plane about said anchor, said flexible tension link being operable to be connected to the animal to restrain the animal.

* * * * *

UNITED STATES PATENT AND TRADEMARK OFFICE
CERTIFICATE OF CORRECTION

| | | |
|---|---|---|
| PATENT NO. | : 7,866,282 B2 | Page 1 of 1 |
| APPLICATION NO. | : 11/913289 | |
| DATED | : January 11, 2011 | |
| INVENTOR(S) | : Terence Earl Simpson et al. | |

It is certified that error appears in the above-identified patent and that said Letters Patent is hereby corrected as shown below:

Title Page

Item (57) ABSTRACT
Delete the entire abstract, and insert the following therefor:

-- An animal restraint apparatus and system. The apparatus includes a housing having an opening and a socket for releasably and pivotably mounting the housing to an anchor. The housing includes a dispenser operable to retractably dispense a flexible tension link through the opening, the flexible tension link being operable to be connected to the animal. The socket includes a passageway between first and second opposite sides of the housing. The housing has at least one projection extending therein, the projection having an inner wall defining at least part of the passageway. The anchor may have a connector configured to cooperate with the socket to releasably and pivotably mount the housing thereto. The anchor may include a screw for securing the anchor to a body of soil. --

Signed and Sealed this
Twenty-third Day of August, 2011

David J. Kappos
*Director of the United States Patent and Trademark Office*